2 Sheets—Sheet 1.

S. D. LOCKE.
Grain-Binder.

No. 9,102. Reissued Mar. 2, 1880.

Attest:
H. B. Rumm
J. A. Rutherford

Inventor:
Sylvanus D. Locke
By Parkinson & Parkinson
Atty's

S. D. LOCKE.
Grain-Binder.

No. 9,102. Reissued Mar. 2, 1880.

Attest:
H. D. Penne.
J. A. Rutherford

Inventor:
Sylvanus D. Locke
By. Poindexter & Poindexter
Atty's

UNITED STATES PATENT OFFICE.

SYLVANUS D. LOCKE, OF HOOSICK FALLS, NEW YORK.

GRAIN-BINDER.

SPECIFICATION forming part of Reissued Letters Patent No. 9,102, dated March 2, 1880.

Original No. 60,208, dated December 4, 1866. Application for reissue filed October 14, 1879.

*To all whom it may concern:*

Be it known that I, SYLVANUS D. LOCKE, formerly of the city of Janesville, county of Rock, and State of Wisconsin, but now of Hoosick Falls, in the county of Rensselaer and State of New York, have invented certain new and useful Improvements in Machines for Binding Grain, of which the following is a specification.

My invention relates to automatic binders in which the band is caused to encircle the gavel and the ends are secured by the action of the machine; and it consists in improvements in the binding-head, in the means by which it is operated, in the mechanism for holding the freshly-severed end of the band material, and in details and combinations hereinafter pointed out and claimed.

Figure 1:
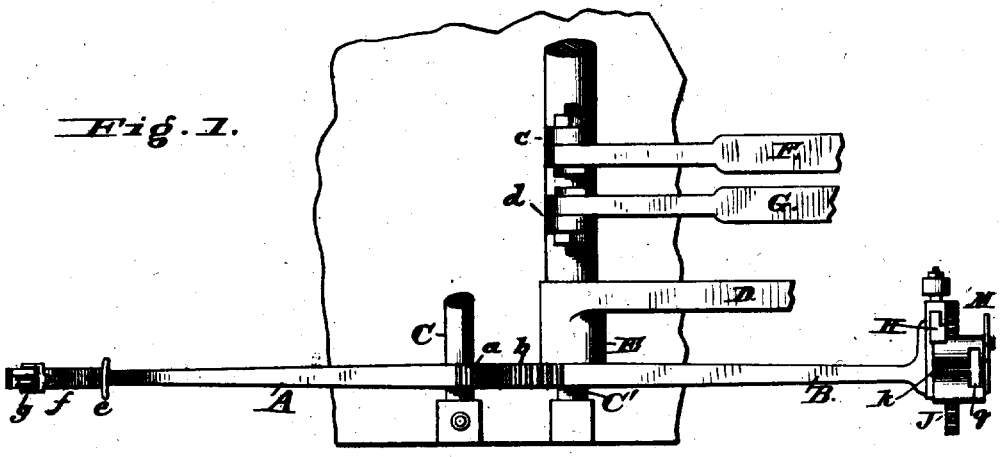
Figure 2:
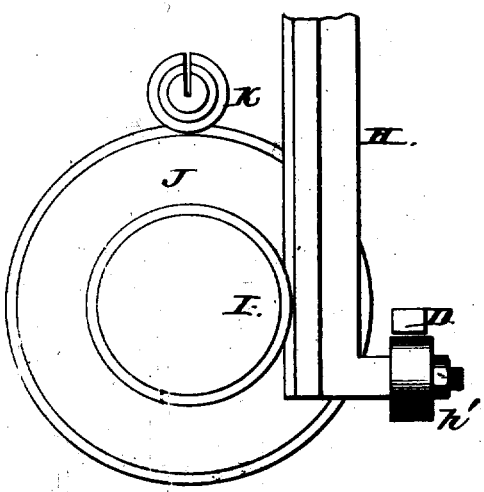
Figure 3:
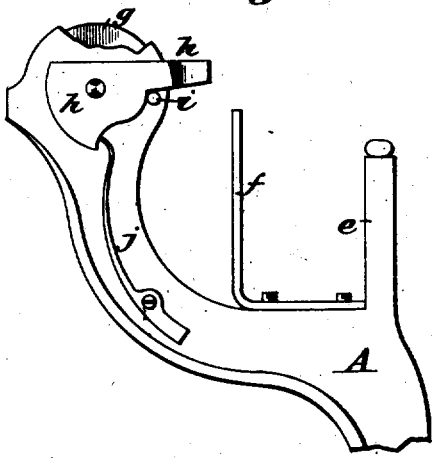
Figure 4:
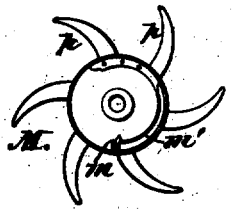
Figure 5:
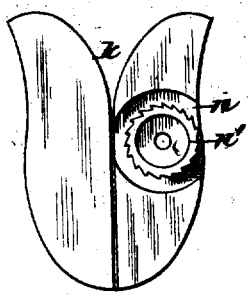
Figure 6:
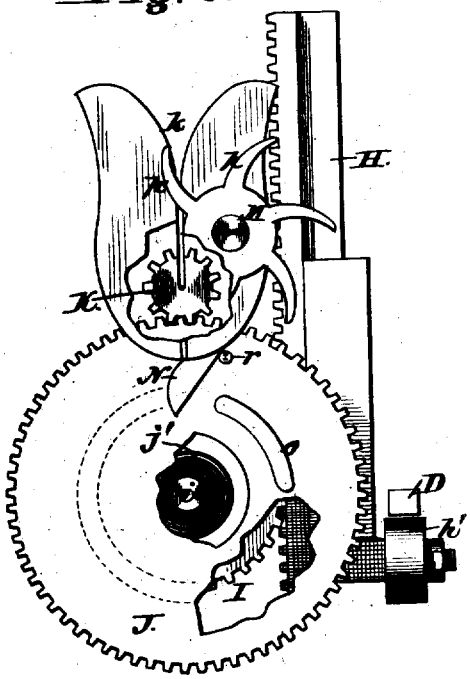
Figure 7:
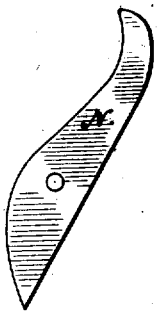

In the drawings, Figure 1 is a top view, representing certain of the parts as they are related to each other. Fig. 2 is a section, showing a part of the binding-head from the back or inside of the same, representing generally the manner of communicating power to the wire-twisting apparatus. Fig. 3 is a view of the end of the binding-arm enlarged. Fig. 4 shows the star-pinion or band-holder detached and reversed, so as to expose the pawl and pawl-spring. In Fig. 5 are shown the seat and ratchet for said star-pinion and pawl. Fig. 6 is an end view of the binding-head, portions being broken away so as to properly represent the connection of the various parts with each other. Fig. 7 gives the general form of the knife used for cutting the wire after a bundle has been bound.

The various members herein described have been illustrated in connection with other elements of an automatic binder in Letters Patent No. 56,580, granted me July 24, 1866, the application for which was concurrent with the original application in this case, and reference to said patent will assist in properly understanding the nature and mode of operation of the present invention.

A is the band-carrying arm, and B the arm which carries the binding-head, secured, respectively, to the shafts C C′, and meshing with and operating upon each other at their heel ends by means of the segmental gears *a b*. D is the arm which operates the band-securing mechanism, E the hub to which it is attached, and F G pitmen or motive arms moving independently of each other, and actuating, the former the arms A and B and the latter the arm D, by means of the cranks *c d*.

Upon the outer end of the band-carrying arm are two fingers, *e f*, and at the point the pulley or sheave *g* and the spring-dog *h*. This dog is held to its proper position against the pin *i* while closing with the binding-head by the spring *j*. The binding-head is mounted on the outer end of the arm B.

In appropriate ways moves a sliding rack, H, having a lateral lug, upon which turns the anti-friction roll *h′*. The rack meshes with a pinion, I, made fast to a gear-wheel, J, which drives the twister K.

Upon the pinion-shaft *i′* is a scroll-spring, *j′*, so connected that it is wound up by the forward revolution of the pinion in the twisting operation.

The twister is mounted in a suitable casing, slotted, as at *k*, to receive and guide the wire, and upon this casing, to one side of the slot, is mounted a star-pinion or belay-wheel, M, so that as it revolves its arms shall successively project over the slot. This star-pinion serves as a wire-holder, and it is driven, one arm at a time, by the dog upon the band-carrying arm. It is provided on the under side with a pawl, *m*, against which presses a spring, *m′*.

In the seat *n*, formed in the side of the casing for the cylindrical shank of the star-pinion, is a fixed ratchet, *n′*, against the periphery of which the pawl is constantly borne by its spring, and by which retrograde motion of the pinion is prevented. The pawl, instead of the ratchet, may be fixed, and the ratchet make a part of or be attached to the star-pinion.

A knife, N, is pivoted to the binding-head and vibrated by a segmental projection, *o*, upon the face of the gear-wheel J, coming against it, as indicated in dotted lines, so as to swing it across the slot in the twister beneath the holder and cut the wire between the two.

The wire is taken from reel or other equivalent device stationed near the binding-head on the arm B, passed along the arms B A and around the pulley *g* on the outer end of the band-carrying arm A, and carried back to the binding-head, where it is passed around an arm, *p*, of the star-pinion, and then introduced into and through the slot *k* into the opening or mortise *q*, when it is secured by twisting a knot on the end. This knot will now perpetuate itself as the machine is worked.

The fingers *e f* are used to carry the wire down into and keep it secure in the jaws of the binding-head, the former passing down just back of the jaws and the latter passing into the mortise *q*. This object is more fully secured through the co-operation of the star-pinion, one arm of which is carried down by the wire and spring-dog, while another arm is brought into position above it and kept in place by the pawl, thus rendering it impossible for the wire to escape in any contingency. The dog being held in position against its stop-pin by a spring, and acting positively in the forward movement of the band-carrying arm, readily yields and rides over the arms of the star-pinion as during the working of the machine the binding-arms are carried back to their original position, (shown in Fig. 1.)

The vibrating arm D, actuated at the proper time (immediately after the ends of the wire have been brought together within the binding-head) by its pitman, swings back, pressing against the roll upon the rack and drawing the latter down, thus communicating motion to the pinion and gear-wheel, which in turn rotate the twisting-pinion, and at the same time wind up the scroll-spring.

After the proper twisting of the wire around the sheaf it will be found that the segmental projection *o* on the gear J, through its revolution, has been brought in contact with the cutting-knife, carrying it forward so far as to sever the wire midway of the twist, so as to leave a twisted knot on the cut or free end of the wire in addition to the twist uniting the ends of the wire on the bundle.

When the pressure of the arm D is removed from the anti-friction roll *h'* the scroll-spring *j'* causes the several parts described as belonging to the binding-head to return to the position shown in the drawings, the pin *r* in this movement coming into contact with the knife and returning it also to its original position.

After the wire is severed and the binding-arms A B commence opening, the cut or free end of the wire above mentioned lies in the mortise *q*, and is prevented from being withdrawn from the slot *k* and thus escaping by the twisted knot aforesaid and by an arm of the star-pinion, which was brought down above the wire as it entered the slot, as above described.

As the binding-arms continue to open the wire is carried over and looped around the arm last above mentioned of the star-pinion, and thence laid horizontally across or under the binding-table, while the cut or free end with the twisted knot is still retained in the mortise. If the operation of binding be repeated, the wire will be passed around the bundle and inserted again in the twisting-pinion, as also in the slot. As the wire is inserted in and passes down the slot it meets the arm of the star-pinion, around which passes the looped end of the wire aforementioned, and, with the aid of the spring-dog, drives it down over the face of the slot, taking with it the loop and twisted knot and turning the star-pinion sufficiently to bring down another arm, around which, after being twisted and a knot formed, the wire is looped as before.

It will be seen that the office of the spring-dog is to aid the wire in operating the star-pinion. Properly constructed, the star-pinion can be operated by the wire alone; but, to give certainty and uniformity to its movement, I prefer to use the spring-dog.

It will also be seen that the office of the star-pinion is peculiar and important. After the wire is looped around the first arm of the star-pinion and then passed around the bundle and again inserted in the slot, driving down the first arm and bringing the second arm above the wire, as above described, the end of the wire is not released, but the first arm, though somewhat withdrawn, is still retained in the loop, thus holding the end of the wire until the bundle is bound and the twisted knot and loop are again formed. Indeed, to insure the holding of the wire, the first arm is not entirely withdrawn from the loop until the wire is, for the third time, inserted in the slot, driving down the second arm and bringing above it, as before described, the third arm. Were the arm, as it is being driven down the slot, to be withdrawn from the loop, the end of the wire would escape or be drawn with the twisted knot against the cutting-face of the twisting-pinion, in either event preventing the continuous working of the machine.

The arms of the star-pinion are made tapering and hooked, so as to admit of their being easily withdrawn from the loop by being driven onward, as above described.

It will be seen that the scroll-spring may be dispensed with by attaching or connecting the outer or working end of the vibrating or reciprocating arm D to the reciprocating rack, and so driving the rack in both directions by the arm.

The intermediate gear-wheels may also be dispensed with by running the rack in direct connection with the twisting or tying device.

In case other twisting devices or a tying device be used, one or both of these last arrangements might be desirable; but when using the slotted twisting-pinion I prefer to employ the scroll-spring, as also the intermediate gear-wheels, as by so doing the rack is shortened and the parts more readily adjusted, so as to uniformly and surely return the slotted pinion, after the bundle is bound, to the desired position, with its slot so presented as to again freely receive the wire when the binding-arms engage.

I am aware that a twisting and also a tying device have been used, and I do not claim them or either of them, except when combined as hereinafter mentioned.

I am also aware that a star-pinion or belay-wheel has been used, and I do not claim it, except when constructed and operated substantially as and for the purposes described.

I claim as my invention—

1. The combination of a revolving twisting or tying device, a rack reciprocating in ways and gearing with said device, an independent vibrating arm by which the rack is driven in one direction, and a scroll-spring upon the pivot of one of the gears in the train, which is wound up by the positive forward movement of the rack, and returns it to position at the conclusion of such movement.

2. The combination of a moving binding-head, a reciprocating rack mounted in ways in said binding-head and gearing with the band-securing mechanism, and an independent vibrating arm by which the rack is driven.

3. The combination of a revolving twisting or tying device and a scroll-spring with a vibrating cutting device, substantially as set forth.

4. The combination, in a binding-head, of a rotary twister and a rotary holder.

5. The combination, in a binding-head, of a rotary twister, a rotary holder, and a cutter between the two.

6. The combination, in a binding-head, of a rotary twister, a rotary holder, and a cutter between the two, actuated by the same pinion which drives the twister.

7. In combination with the band cutting and securing devices, a rotary band-holder mounted at the side of a slot, through which the band is passed, with its radial holding-arms projecting over said slot in their revolution.

8. In combination with the rotary band-holder having radial holding-arms and positive mechanism for moving it intermittingly in one direction, a pawl and ratchet to prevent retrograde motion.

9. A rotary band-holder having radial holding-arms, in combination with a band-carrying arm, actuating said holder in its movement to encircle the gavel by means of a projecting part engaging with one of said arms.

10. A rotary band-holder having radial holding-arms mounted upon the side of a slot, through which the band is passed to the securing device, so that its arms may successively project over such slot as it revolves, in combination with a band-carrying arm, actuating said holder in its movement to encircle the gavel by impingement against one of said arms.

11. The combination, with a rotary twister, of a radially-armed rotary holder, arranged in such relation thereto that when actuated upon the delivery of the band it first presses and retains the latter in the twister, and afterward holds the severed end when it has been twisted and cut.

12. In combination with a rotary twister, a rotary holder having radial holding-arms, serving also as belay-pins, over which the band is looped in the return movement of the band-carrying arm to receive a fresh gavel.

13. In combination with a rotary band-holder having radial holding-arms, a mortise or enlargement in the casing beneath such holder for the twist upon the wire.

14. In combination with a rotary band-holder and a vibrating band-carrying arm, a pivoted dog upon the latter, arranged to drive the holder positively in the forward movement of the arm and ride over it upon the return stroke.

15. In combination with a rotary band-holder and a vibrating band-carrying arm, a pivoted dog upon the latter, arranged to drive the holder positively in the forward movement of the arm and ride over it upon the return stroke, and a pawl and ratchet whereby the holder is locked against the stress of the dog in such return.

SYLVANUS D. LOCKE.

Witnesses:
WM. M. ARCHIBALD,
C. A. BROWN.